(12) United States Patent  
Schreiber

(10) Patent No.: US 7,033,131 B2
(45) Date of Patent: Apr. 25, 2006

(54) FAN BLADE FOR A GAS-TURBINE ENGINE

(75) Inventor: Karl Schreiber, Mellensee (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 105 days.

(21) Appl. No.: 10/758,214

(22) Filed: Jan. 16, 2004

(65) Prior Publication Data
US 2004/0151592 A1 Aug. 5, 2004

(30) Foreign Application Priority Data
Jan. 18, 2003 (DE) ................ 103 01 755

(51) Int. Cl.
F01D 5/12 (2006.01)

(52) U.S. Cl. ............ 415/12; 415/119; 416/235; 416/500

(58) Field of Classification Search .......... 415/12, 415/119; 416/500, 233, 235, 236 R, 228, 416/231 B
See application file for complete search history.

(56) References Cited

U.S. PATENT DOCUMENTS

| 1,970,435 | A | * | 8/1934 | Sharp ............... 416/186 A |
| 2,463,340 | A | * | 3/1949 | Wiberg .............. 416/232 |
| 4,097,192 | A | * | 6/1978 | Kulina .............. 416/500 |
| 4,497,613 | A | * | 2/1985 | Carreno ............. 416/228 |
| 5,348,446 | A | * | 9/1994 | Lee et al. .......... 416/241 R |
| 5,692,881 | A | | 12/1997 | Leibfried |
| 5,738,491 | A | * | 4/1998 | Lee et al. .......... 415/177 |
| 6,033,186 | A | | 3/2000 | Schilling et al. |

FOREIGN PATENT DOCUMENTS

| CH | 577108 | 6/1976 |
| DE | 1627779 | 7/1971 |
| DE | 3507578 | 9/1985 |
| GB | 1089247 | 11/1967 |
| GB | 2155558 | 9/1985 |

OTHER PUBLICATIONS

German Seach Report dated Jan. 18, 2003.

* cited by examiner

Primary Examiner—Edward K. Look
Assistant Examiner—Igor Kershteyn
(74) Attorney, Agent, or Firm—Harbin King & Klima

(57) ABSTRACT

For material reduction, a fan blade made of solid material for a gas-turbine engine is provided in the area of the blade tip with at least one cavity (5) extending from the face of the blade tip. Thus, apart from the aspect of weight saving, the vibration amplitudes and the centrifugal forces can be reduced considerably and the natural vibration behavior improved in a simple manner, ultimately increasing mechanical strength.

23 Claims, 2 Drawing Sheets

A-A

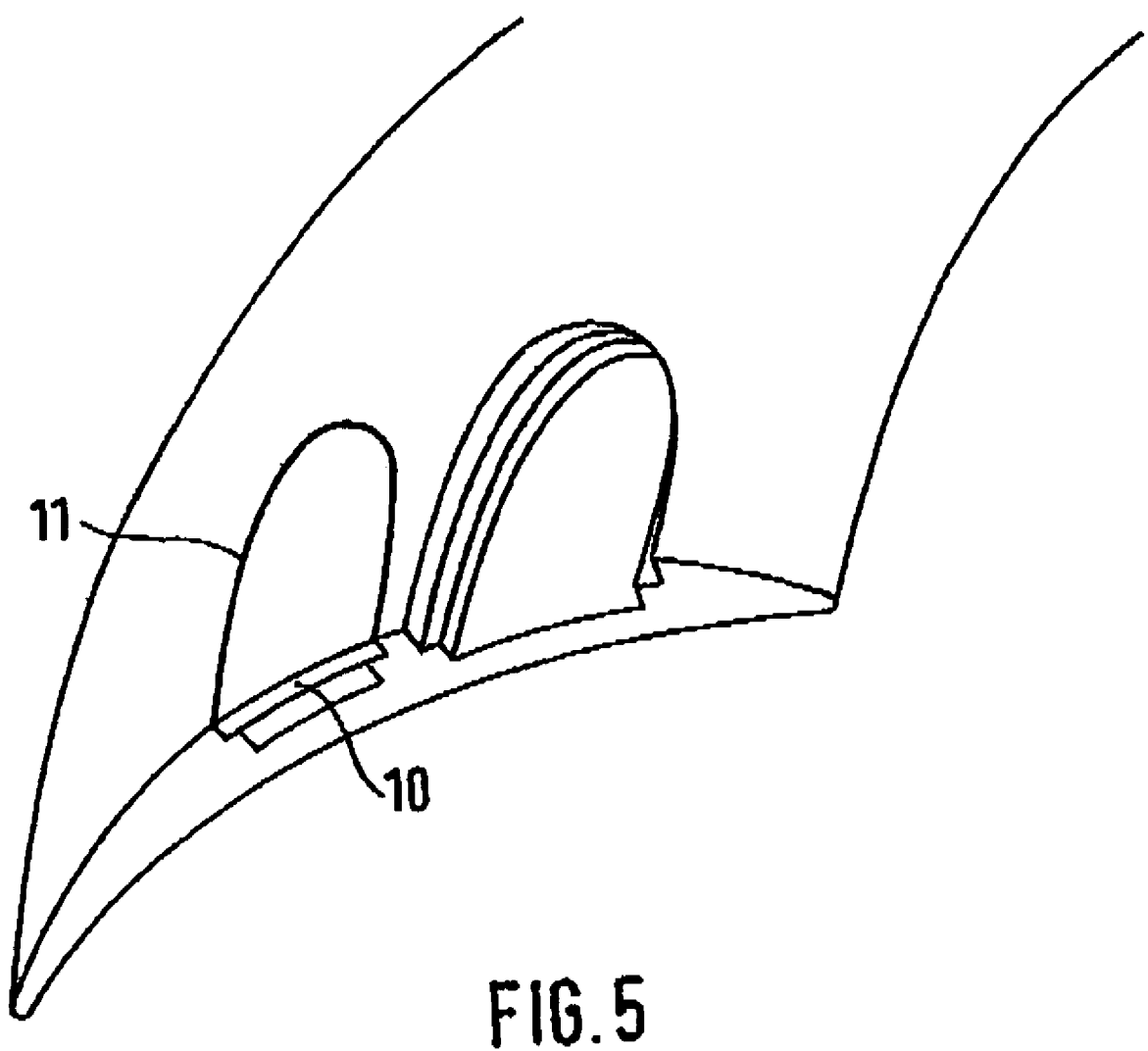

FAN BLADE FOR A GAS-TURBINE ENGINE

This application claims priority to German Patent Application DE10301755.0 filed Jan. 18, 2003, the entirety of which is incorporated by reference herein.

BACKGROUND OF THE INVENTION

This invention relates to a fan blade in solid material for a gas-turbine engine.

The fan blades are the foremost rotating components of a gas-turbine engine. Besides the inflowing air, these blades are exposed to ingested foreign bodies, such as birds, primarily in the take-off phase. In order to withstand the extremely high loads, in the event of a bird strike for example, the fan blades, which are made of a solid high strength-material, such as titanium or a corresponding alloy for example, must be dimensioned adequately. The high weight resulting therefrom significantly increases the costs of these blades and entails high mechanical loads arising from the natural vibrations and the vibration amplitude as well as the centrifugal forces. Furthermore, the fan protective casings, or fan containments, must be designed in correspondence with the weight of the fan blades. This involves a further increase in weight and additional costs.

For high-power aircraft engines, fan blades with closed, inner cavities have already been proposed to reduce the weight and to avoid the disadvantages resulting from too high a mass. The methods for the production of such hollow blades described, for example, in U.S. Pat. No. 6,033,186 and U.S. Pat. No. 5,692,881 are, however, very costly. Particularly with small and medium-power engines, the high costs for such hollow fan blades are not effective in relation to the weight saving obtained and the advantages resulting from such a weight saving.

BRIEF SUMMARY OF THE INVENTION

The present invention, in a broad aspect, provides for the development of a mass-reduced and mechanically highly loadable fan blade for gas-turbine engines which is easily and cost-effectively manufacturable and satisfies high safety requirements.

It is a particular object of the present invention to provide solution to the above problems by a fan blade designed in accordance with the features described herein. Further objects and advantages of the present invention will be apparent from the description below.

The basic idea underlying the present invention is that a fan blade made of a solid material, for example a titanium forging, is provided, in a limited blade tip area, with a cavity starting out from the blade tip face or with several cavities separated from each other by reinforcing ribs. In other words, the major part of the fan blade, starting out from the blade root, consists of a solid material, while only a limited area at the blade tip is provided with cavities extending to the blade root. The cavity extends only over a blade area which is subject to relatively low operating loads. The operating loads in the cyclic mode are preferably <150 Mpa (Megapascal).

The cavities are formed directly into the solid material, for example by an electro-chemical machining process. It is also possible to make the fan blade in two parts, namely a solid blade portion (solid blade root portion) and a separately produced hollow blade portion (hollow blade tip portion), with both portions being connected by a joining process. The separately produced hollow blade portion can also be made from a sheet-metal shell and be constructed of a material other than that of the solid blade portion.

With a relatively low and, in particular, easily obtainable weight reduction in a limited area extending from the blade tip, the centrifugal forces and stresses present at the blade root can be reduced considerably or be set optimally. For example, a weight reduction in the tip area of 3 percent enabled the centrifugal forces effective at the blade root to be reduced by 12 percent. The saving of mass only in the tip area by cavities formed from the free face reduces the effective length of the blade mass on the whole, namely in terms of a shortening of the blade, thus reducing the vibration amplitudes and raising the natural frequencies, resulting in considerably lower stress and damage to the fan blades. If several cavities are provided side by side and apart from each other, the reinforcing ribs formed between these cavities contribute to the mechanical strength of the blade tip portion. A further, significant advantage of the proposed fan blade is its simple, cost-effective manufacturability, in particular since the cavity forming process can be included in the normal manufacturing technologies for solid fan blades without any difficulty.

The length and the cross-sectional size and shape of the cavities are variable over the width of the fan blade. Preferably, the central cavities are longer and larger than the sideward cavities, and, particularly preferably, the cavity situated close to the leading edge has the shortest length and the smallest cross-sectional size. The arrangement and the shape and size of the cavities in the blade tip enable the stress distribution in the blade root to be optimally set. It is an essential criterion of the present invention that the size and design of the cavities extending from the blade tip does not influence the stiffness of the fan blade.

In accordance with a further feature of the present invention, the fan blade can also be made of two, separately produced parts, namely a solid blade root portion and a blade tip portion with the formed-in cavities, with both portions being connected by a known joining process.

BRIEF DESCRIPTION OF THE DRAWINGS

The present invention is more fully described in the light of the accompanying drawings showing an embodiment. In the drawings, FIG. 5 is a view showing pockets produced from the blade suction side which subsequently are closed with aerodynamically conformal plates.

DETAILED DESCRIPTION OF THE INVENTION

Figure 1:
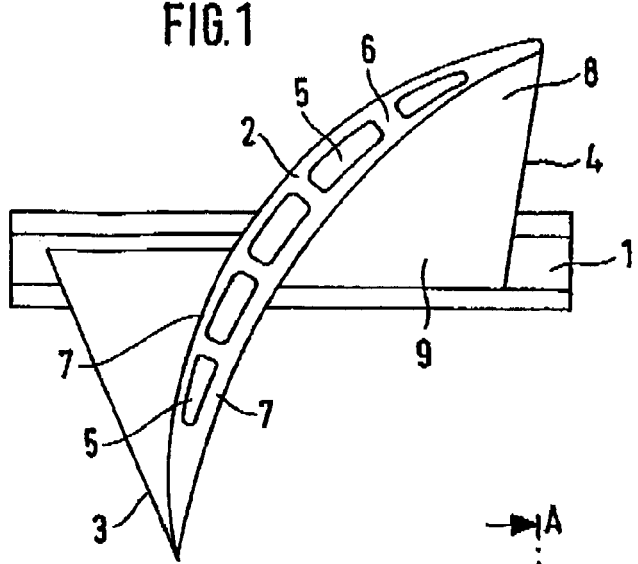
FIG. 1 is a top view of an inventive fan blade for a gas-turbine engine.
Figure 2:
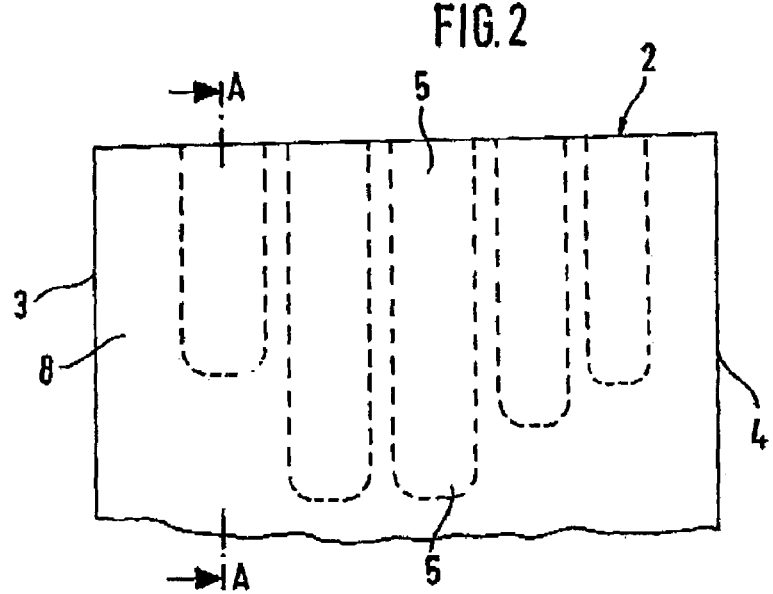
FIG. 2 is a side view of the upper part of a fan blade with cavities indicated by broken lines.
Figure 4:
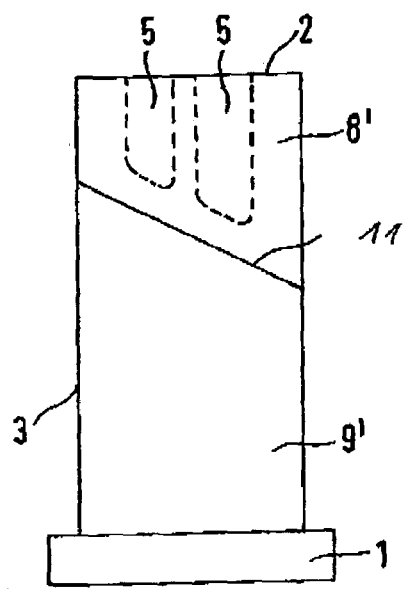
FIG. 4 is a side view of a fan blade including a solid lower portion and a hollow blade tip portion.
Figure 3:
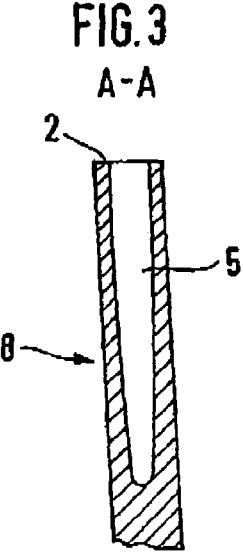
FIG. 3 is a section A—A in accordance with FIG. 1 showing a cross-section of a cavity provided in the fan blade.

This detailed description should be read in conjunction with the summary of the invention above. The titanium fan blade shown in FIG. 1 comprises a blade root 1 and a blade tip 2. It has a leading edge 3 and a trailing edge 4. Arranged in the upper third of the fan blade, the blade tip portion 8, are cavities 5 which start out from the blade tip 2 and which are separated by reinforcing ribs 6. The reinforcing ribs 6 and the thickness of the remaining blade wall 7 ensure the stiffness of the fan blade and the required shear stress transfer. The cavities 5 have an essentially rectangular cross-sectional shape. Other shapes, for example round or oval, are also possible. As is shown in FIGS. 2 to 4, the cavities 5 are situated only in the tip area, or approximately in the upper third of the fan blade, with the remaining area, the blade root portion 9, being solid. The contour of the longitudinal axis of the long cavities 5 conforms to the shape of the fan blade. For example, the longitudinal axis of the cavities 5 situated in the blade upper third follows the twist of the fan blade shown in FIG. 1. As is shown in FIG. 3, the cross-sectional area of the respective cavity 5 gradually decreases in its lower part (in the blade interior) to keep low the notch stresses at the transition to the solid portion of the fan blade.

As becomes apparent from FIGS. 2 and 4, the cavities 5 in one and the same fan blade can extend over different depths into the solid material and can also have different cross-sectional sizes. For example, the cavity 5 situated at the leading edge 3 is sufficiently spaced from the leading edge and also has a smaller cross-section and a shorter length to provide for the high loads which occur in this area in the event of a bird strike. In the blade mid-section, however, the cavities 5, as shown in FIG. 2, extend deeper in order to remove as much material as possible from the solid in this area of high wall thickness and achieve a significant weight reduction.

A further variant of the present invention is illustrated in FIG. 4. Here, the fan blade is made of two, separately produced parts, namely a hollow blade portion 8' and a solid blade portion 9', with both portions being connected at joint 11 by a suitable joining process.

Starting out from the blade tip 2, the cavities 5 can be produced by a suitable process, for example erosive electrochemical machining. In the case of the fan blade made of two portions (8', 9'), which allows an even larger weight saving, it is also possible to use a different material for the hollow blade portion 8' to improve its bird strike strength, for example titanium with higher ductility (such as TiCu2 or Ti64 half). A separately made blade tip portion 8' can also include a sheet-metal shell made of titanium-base precision casting. FIG. 5 shows an embodiment where open pockets are created on the blade suction side and which are subsequently closed with aerodynamically conformal plates 10 at joint 11 to create the cavities 5.

What is claimed is:

1. A fan blade in a solid material for a gas-turbine engine, including a blade root attachable to a fan rotor disk and an opposite blade tip, wherein at least one cavity starting out from a free face of the blade tip and extending in a direction of the blade root is provided in a limited blade tip portion, the at least one cavity comprising a pocket initially open to a suction side of the blade and a plate joined to the blade to at least partially close the pocket.

2. A fan blade in accordance with claim 1, wherein the fan blade includes several cavities and at least one of a length and a cross-sectional area of the several cavities varies over the width of the fan blade.

3. A fan blade in accordance with claim 2, wherein one of the cavities situated closer to a leading edge of the fan blade has at least one of a smaller length and a cross-sectional area than a cavity situated closer to a center of the blade.

4. A fan blade in accordance with claim 2, wherein a cavity near a center of the blade has the greatest length.

5. A fan blade in accordance with claim 1, wherein a cross-sectional shape of the at least one cavity is at least one of essentially rectangular, oval and round.

6. A fan blade in accordance with claim 1, wherein a longitudinal axis of the at least one cavity follows a twist of the blade.

7. A fan blade In accordance with claim 1, wherein a cavity cross-section decreases gradually at its bottom end facing the blade root and runs out in the form of a wedge.

8. A fan blade in accordance with claim 1, wherein the at least one cavity is produced by erosive material removal from a solid fan blade.

9. A fan blade in accordance with claim 1, comprising a separately made solid blade portion and a separately made hollow blade portion which are connected together.

10. A fan blade in accordance with claim 9, wherein the separately made hollow blade portion comprises a sheet-metal shell.

11. A fan blade in accordance with claim 9, wherein the separately made hollow blade portion is produced from solid material by erosive material removal.

12. A fan blade in accordance with claim 9, wherein the separately made hollow blade portion is constructed of a material that is different than that of the solid blade portion.

13. A fan blade in accordance with claim 1, wherein the blade comprises several cavities separated from each other by reinforcing ribs.

14. A fan blade for a gas-turbine engine, comprising:
   a substantially solid blade root portion constructed and arranged to be attachable to a fan rotor disk; and
   a blade tip portion opposite the blade root portion, the blade tip portion including at least one cavity starting out from a free face of the blade tip portion and extending in a direction toward the blade root portion,
   wherein the at least one cavity comprises a pocket initially open to a suction side of the blade and a plate joined to the blade to at least partially close the pocket.

15. A fan blade in accordance with claim 14, wherein the fan blade includes several cavities and at least one of a length and a cross-sectional area ol the several cavities varies over the width of the fan blade.

16. A fan blade in accordance with claim 15, wherein one of the cavities situated closer to a leading edge of the fan blade has at least one of a smaller length and a cross-sectional area than a cavity situated closer to a center of the blade.

17. A fan blade in accordance with claim 15, wherein a cavity near a center of the blade has the greatest length.

18. A fan blade in accordance with claim 14, wherein a longitudinal axis of the at least one cavity follows a twist of the blade.

19. A fan blade in accordance with claim 14, wherein a cavity cross-section decreases gradually at its bottom end facing the blade root portion.

20. A fan blade in accordance with claim 14, wherein the blade root portion and the blade tip portion are separate components connected together.

21. A fan blade in accordance with claim 20, wherein the blade tip portion comprises a sheet-metal shell.

22. A fan blade in accordance with claim 20, wherein the blade tip portion is constructed of a material that is different than that of the blade root portion.

23. A fan blade in accordance with claim 14, wherein the blade tip portion comprises several cavities separated from each other by reinforcing ribs.

* * * * *